United States Patent [19]

Cullum et al.

[11] Patent Number: 5,284,415
[45] Date of Patent: Feb. 8, 1994

[54] SINGLE-POWERED UNDERLIFT TOWING APPARATUS

[75] Inventors: John M. Cullum; Hans G. Ogren, both of Germantown, Tenn.

[73] Assignee: Vulcan International, Inc., Olive Branch, Miss.

[21] Appl. No.: 893,105

[22] Filed: Jun. 3, 1992

[51] Int. Cl.$^5$ .............................. B60P 3/06
[52] U.S. Cl. .............................. 414/563; 280/402
[58] Field of Search .................. 414/563; 280/402

[56] References Cited

U.S. PATENT DOCUMENTS

| | | | |
|---|---|---|---|
| 3,434,607 | 3/1969 | Nelson | 414/563 |
| 3,667,631 | 6/1972 | Bishop | 414/563 |
| 3,951,280 | 4/1976 | Peck | 414/563 |
| 4,473,334 | 9/1984 | Brown | 414/563 |
| 4,573,857 | 3/1986 | Porter, Sr. et al. | 414/563 |
| 4,634,337 | 1/1987 | Hamman | 414/563 |
| 4,637,623 | 1/1987 | Bubik | 414/563 X |
| 4,678,392 | 7/1987 | Capers et al. | 414/563 |
| 4,761,110 | 8/1988 | Boutilier | 414/563 |
| 4,775,285 | 10/1988 | Zackovich | 414/563 |
| 4,793,763 | 12/1988 | Bubik | 414/563 |
| 4,797,057 | 1/1989 | Shoup et al. | 414/563 |
| 4,798,509 | 1/1989 | Bubik | 414/563 |
| 4,815,915 | 3/1989 | Crupi, Jr. | 414/563 |
| 4,874,285 | 10/1989 | Bubik | 414/563 |
| 4,927,315 | 5/1990 | Nespor | 414/563 |
| 4,946,182 | 8/1990 | Weber | 414/563 X |

*Primary Examiner*—David A. Bucci
*Attorney, Agent, or Firm*—Niro, Scavone, Haller & Niro

[57] ABSTRACT

An improved lifting and towing apparatus using a single hydraulic cylinder powering the rotation of a boom to lift a vehicle to be towed or to fold and store the apparatus through the use of a double pivot. The double pivot allows the apparatus to efficiently lift the towed vehicle while minimizing boom overhang when in the folded-stored position, and maximizing ground clearance. The present invention may be used with underlift equipment of various types and sizes, including light and heavy duty equipment, and both wheel and frame-lift systems.

8 Claims, 5 Drawing Sheets

1

SINGLE-POWERED UNDERLIFT TOWING APPARATUS

This invention is directed to an apparatus for lifting and towing vehicles. More particularly, the present invention relates to a simple mechanical mechanism used in so-called "underlift" towing and recovery vehicles for effecting the various movements of the underlift to both properly engage the vehicle to be towed and raise the underlift to a stored position when not in use.

BACKGROUND OF THE INVENTION

The use of underlift and wheel lift towing apparatus is well known. Such apparatus are disclosed in Brown, U.S. Pat. No. 4,473,334; Hamman, U.S. Pat. No. 4,634,337; Bubik, U.S. Pat. No. 4,637,623; and Bubik, U.S. Pat. No. 4,793,763, and these patents are incorporated herein by reference. Often, such apparatus may be folded into an upright, stored position. (See, for example, Brown, U.S. Pat. No. 4,473,334.) These apparatus usually employ a hydraulic cylinder which, as it is extended, rotates the vehicle lifting boom (also known as a "stinger") about a pivot point into the stored position.

Because it is desirable to maximize the ground clearance of the stinger assembly while in use or when stored, and because the hydraulic cylinder extends down toward the ground as it lifts the stinger, it is important to bring about this folding-storing motion with a minimum of extension of the hydraulic cylinder. This may be accomplished by locating the axis of rotation of the lifting boom close to the connecting point between the hydraulic cylinder and boom. Thus, a small extension by the hydraulic cylinder causes a large movement by the stinger into the upright, stored position. However, as a result of this short moment arm between the hydraulic cylinder and the axis of rotation such a mechanism may suffer from a significant lack of lifting capacity.

In many situations, the vehicle to be towed is not on a level plane with the towing vehicle, e.g., the vehicle may be downhill or in a ditch. In certain cases, the undercarriage of the vehicle to be towed is configured such that in order to lift the vehicle without damage, the stinger must be tilted in order to properly engage the vehicle. While many stinger assemblies are capable of tilting "positively"—from a horizontal position toward a higher position—to engage the vehicle to be towed, many are not capable of "negative" tilt—that is, dropping the stinger below the level of the axis of rotation of the boom in order to properly engage the vehicle. The inability to provide "negative" tilt is a significant drawback in prior equipment.

Furthermore, after the stinger has engaged the vehicle, it is oftentimes desirable to tilt the stinger to reach the optimum lifting position which often requires substantial additional power. However, some prior art apparatus, which employ a single hydraulic cylinder to move the stinger, lack this additional required power.

SUMMARY OF THE INVENTION

The present invention preserves the advantages of known towing equipment. In addition, it provides new advantages not found in currently available equipment and overcomes many of the disadvantages associated with the known equipment.

Accordingly, it is an object of this invention to provide a simplified mechanical apparatus for lifting and towing which has all of the attendant advantages of more complex apparatus.

It is another object of this invention to provide an apparatus which requires only a single power-actuated means to tilt the stinger and to fold it into a stored position, without the attendant disadvantages of such prior art apparatus.

Yet another object of this invention is to provide an apparatus which requires only a single power-actuated means and which has minimal downward extension when in the folded, stored position, thus maximizing ground clearance.

Yet another object of this invention is to provide an apparatus which requires only a single power-actuated means to store the stinger in an upright position and to tilt it up or down during towing or recovery operations.

Still another object of this invention is to provide an apparatus which requires only a single power-actuated means to rotate the stinger into the upright, stored position, and yet is powerful enough to assist in lifting the vehicle to be towed.

In accordance with the present invention, an improved lifting and towing apparatus is provided which uses a single hydraulic cylinder to lift a vehicle to be towed or to fold and store the apparatus through the use of a double pivot. This double pivot allows the apparatus to efficiently lift the towed vehicle while both minimizing the stinger overhang at the rear of the towing vehicle when in the folded-stored position and maximizing ground clearance. The present invention may be adapted for use with underlift towing equipment of various types and sizes, including light and heavy duty equipment and both wheel and frame-lift systems.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

DESCRIPTION OF THE PREFERRED EMBODIMENTS

Figure 1:
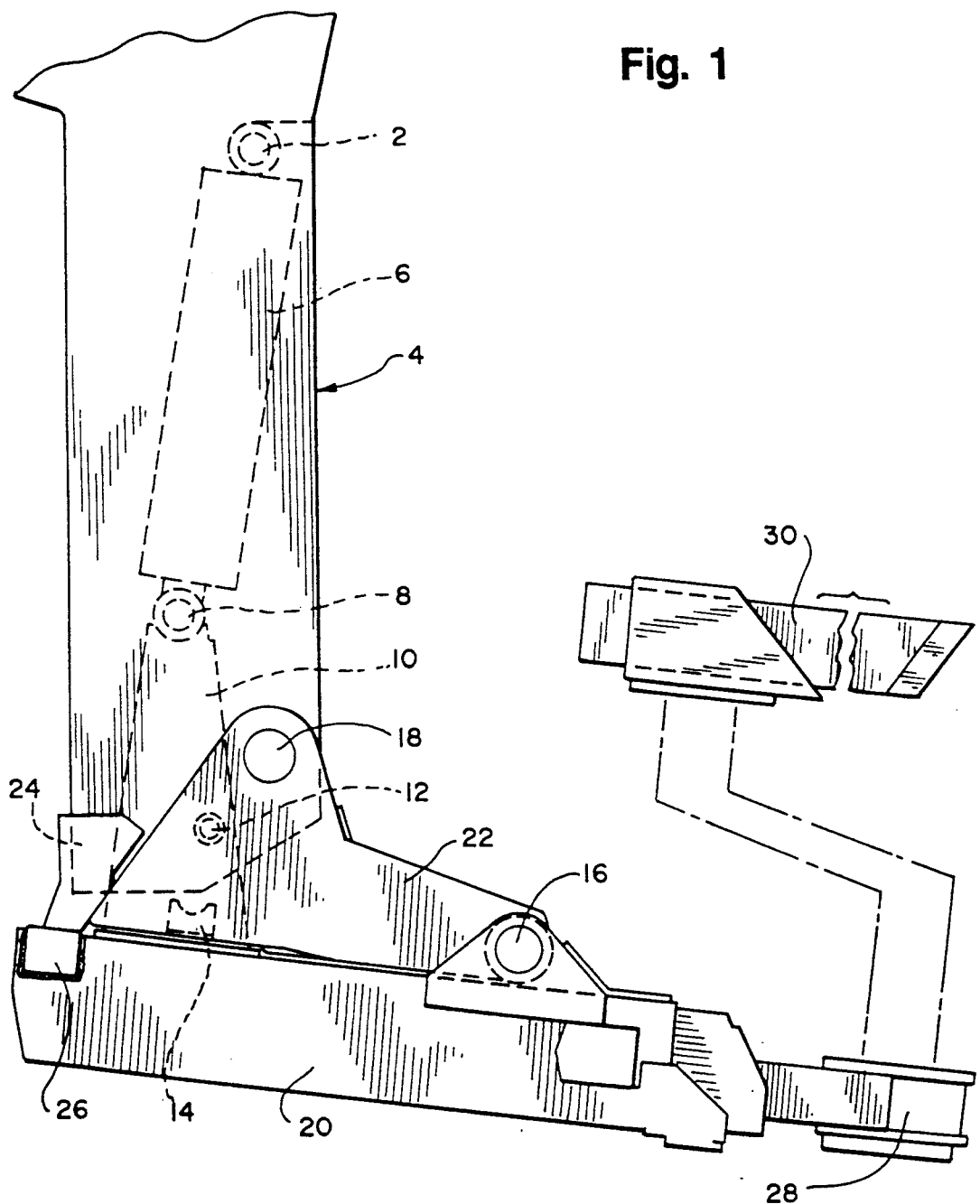
FIG. 1 is a side view of the present invention, shown in the load-lifting position.

The invention is shown in the initial load-lifting position in FIG. 1. Supporting member 4 is rigidly mounted on the rear of a light or heavy duty tow truck. Single power-actuated means 6, which may be a double action hydraulic cylinder, is pivotally connected at its upper end by pivot pin 2 to either supporting member 4 or the towing vehicle frame. The lower end of power-actuated means 6 is pivotally connected to boom flange 10 by pivot pin 8. Boom flange 10 is rigidly mounted to first boom section 20, which is extendable and retractable in a manner well known in the art. First boom section 20 is pivotally connected to second boom section 22 at first axis 16. Second boom section 22 is pivotally connected to supporting member 4 at second axis 18.

Cross bar 28 is pivotally mounted at its center to the distal end of first boom section 20, again in a manner well known in the art. Vehicle engaging mechanism 30, which may engage the vehicle's frame or wheels, is mounted to cross bar 28.

In order to raise the vehicle to be lifted, single power-actuated means 6 is extended to move boom flange 10 downward, which in turn moves the proximal end of first boom section 20 downward. This causes first boom section 20 to rotate about first axis 16, thus raising the distal end of first boom section 20 to raise the vehicle to be towed (not shown).

Figure 2:
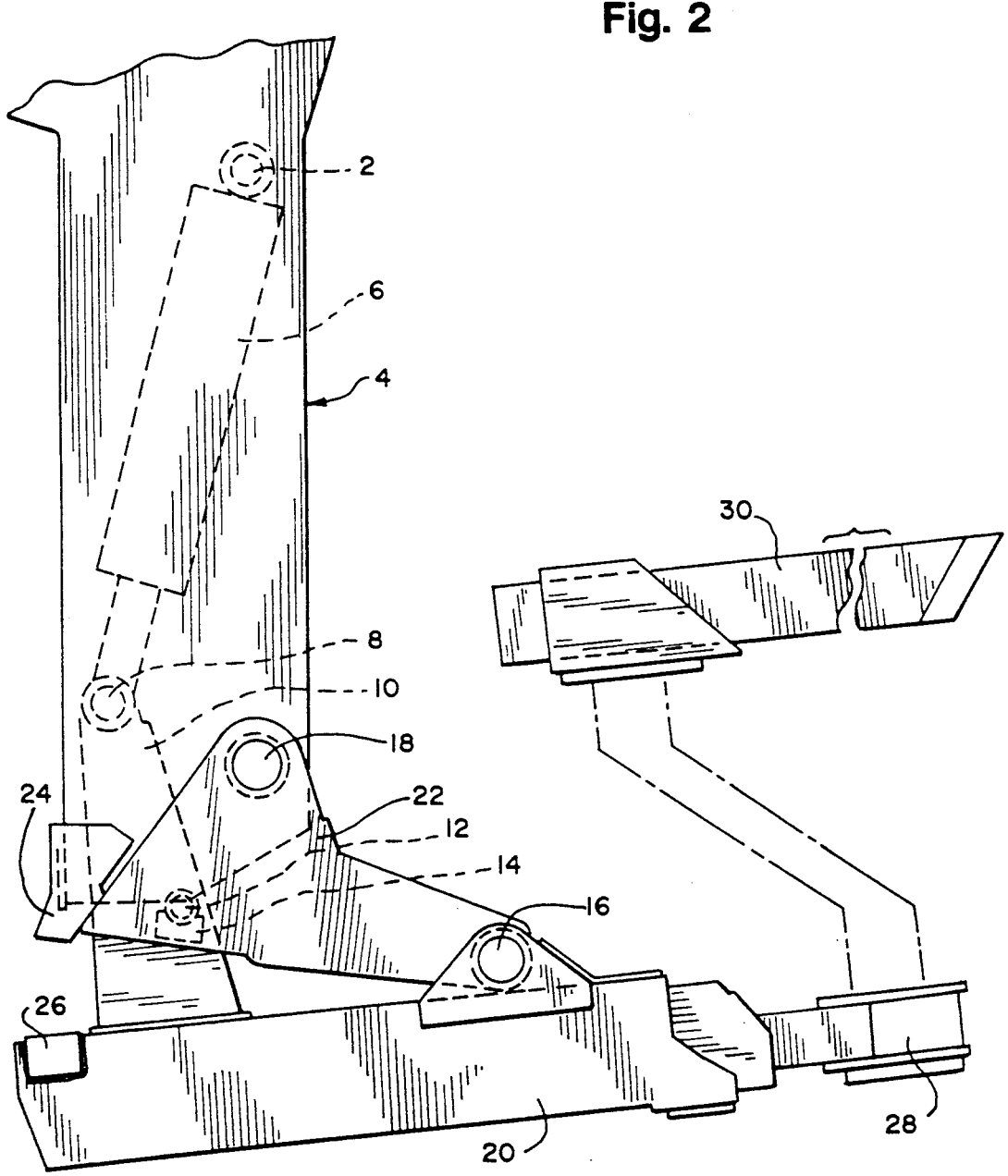
FIG. 2 is a side view of the present invention, shown in a load-carrying position.
Figure 3:
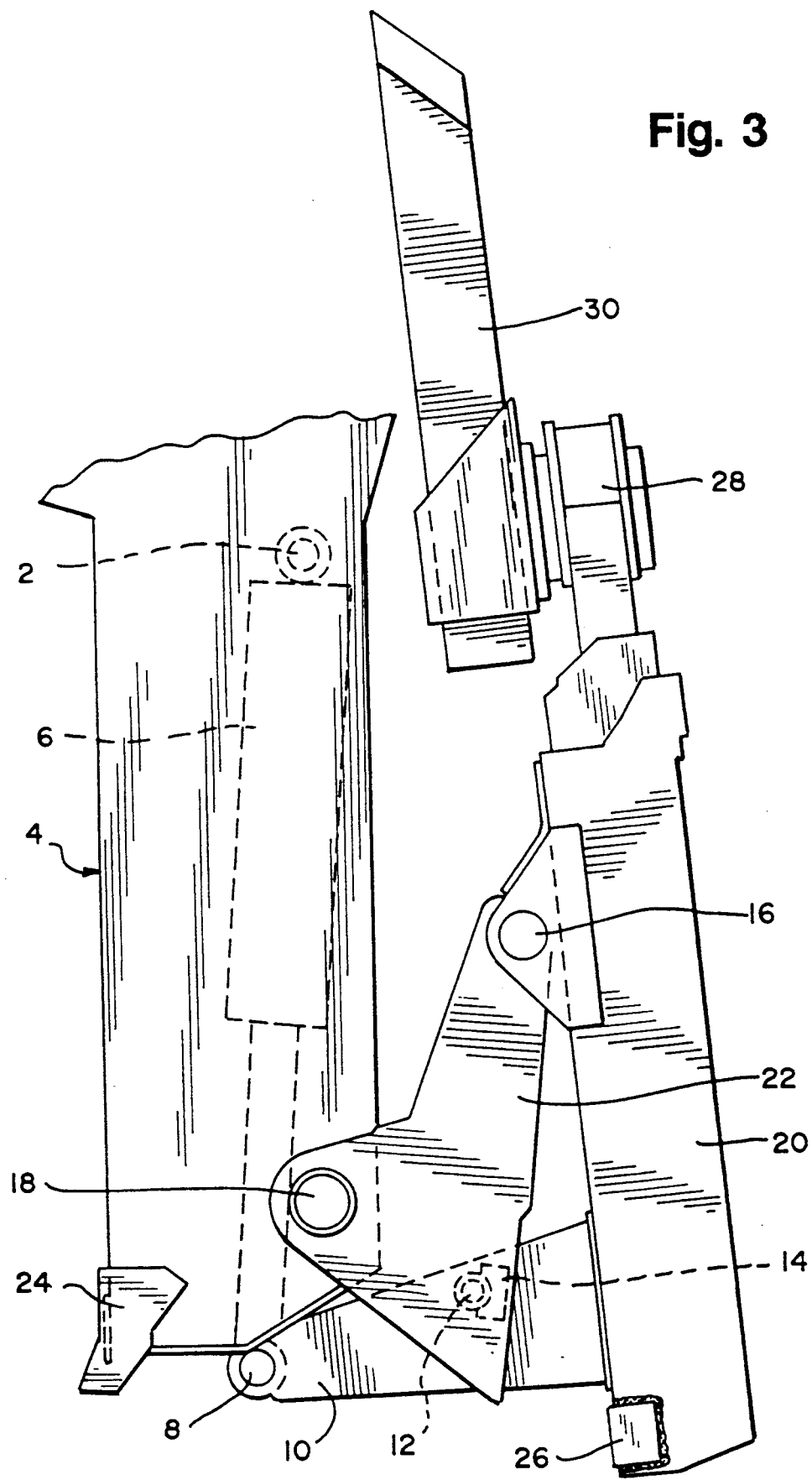
FIG. 3 is a side view of the present invention, shown in the upright, stored position.

When first boom section 2 reaches the position shown in FIG. 2, first abutment means 12, located on boom flange 10, engages second abutment means 14, located on second boom section 22. At this point, further extension of single power-actuated means 6 will cause second boom section 22 to move simultaneously and in fixed rotation with first boom section 20, causing first boom section 20 to rotate about second axis 18 instead of first axis 16. Because second axis 18 is closer to the line of action of single power-actuated means 6 than is first axis 16, further extension of single power-actuated means 6 will cause the distal end of first boom section 20 to rise at a much faster rate and a greater distance than would occur if first boom section 20 were rotating about first axis 16. Thus, first boom section 20 is brought to an upright, stored position with a minimum of extension by single power-actuated means 6, minimizing overhang at the rear of the towing vehicle and maximizing the stinger's ground clearance. The present invention is shown in the upright, stored position in FIG. 3.

Because first axis 16 is located far away from the line of action of single power-actuated means 6, the apparatus is capable of lifting relatively heavy loads for a given rating of the power-actuated means. Placing first axis 16 farther away from the line of action of single power-actuated means 6 will increase the mechanical advantage for lifting the vehicle to be towed. Similarly, placing second axis 18 closer to the line of action of single power-actuated means 6 will decrease the extension of single power-actuated means 6 that is required to fold the first boom section 20 into an upright, stored position, thereby maximizing ground clearance. By varying the distances between the two axes and the line of action, it is possible to tailor the system for particular load and boom requirements.

Figure 4:
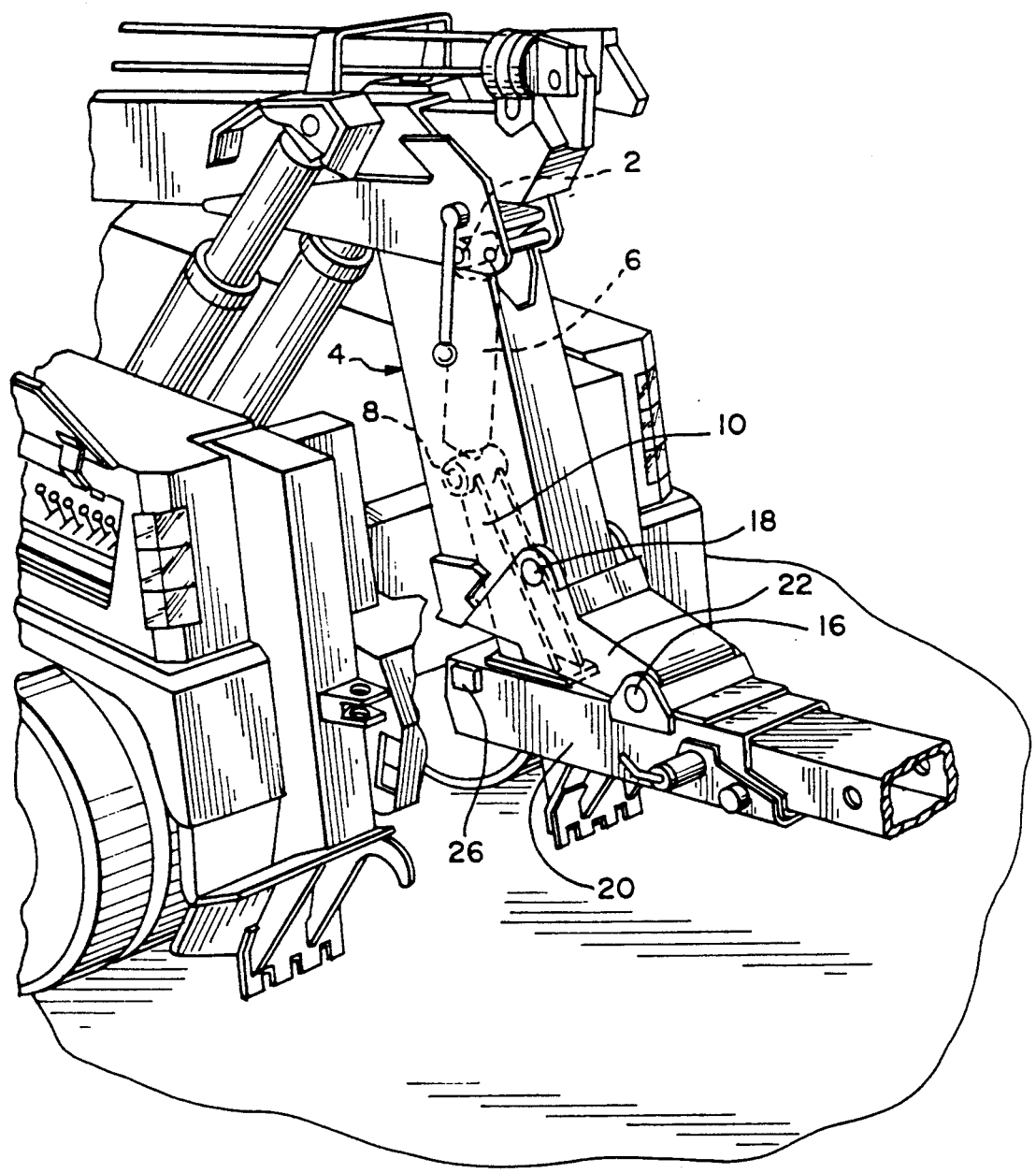
FIG. 4 is a perspective view of the present invention in the load-carrying position mounted o a heavy duty tow truck.
Figure 5:
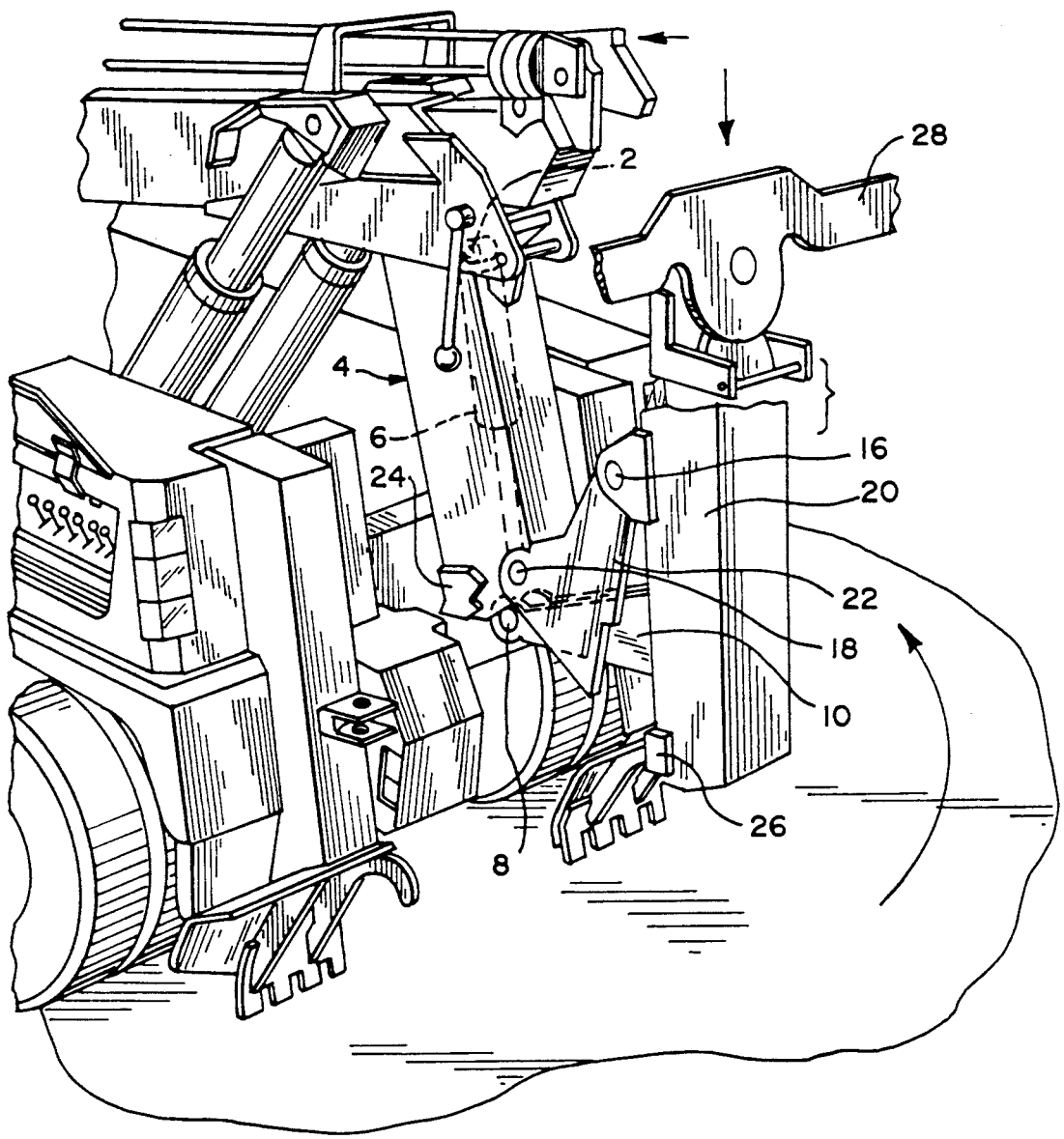
FIG. 5 is a perspective view of the present invention in the upright, stored position mounted on a heavy duty tow truck.

In FIG. 4, the present invention is shown on a heavy duty tow truck in the load-carrying position. FIG. 5 shows the present invention on a heavy duty tow truck in the upright, stored position. To lower the first boom section 20 from the upright, stored position, single power-actuated means 6 is retracted, allowing the distal end of first boom section 20 to swing downward as the section 20 rotates about second axis 18. During this motion, second boom section 22 moves in fixed rotation with first boom section 20 because first abutment means 12 and second abutment means 14 are engaged. When first boom section 20 reaches a generally horizontal orientation (shown in FIG. 2), second boom section 22 makes contact with third abutment means 24 and ceases its movement with first boom section 20. At this point, first abutment means 12 and second abutment means 14 begin to disengage each other and no longer move in simultaneous and fixed rotation with one another. Further retraction of single power-actuated means 6 causes first boom section 20 to rotate about first axis 16.

The downward rotation of the distal end of first boom section 20 is complete when third abutment means 24, located on support member 6, engages fourth abutment means 26, located on the proximal end of first boom section 20.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A vehicle-transporting apparatus comprising:
   a supporting member mountable onto a transporting vehicle;
   a boom having first and second boom sections, said boom extending rom said supporting member and having a distal end on said second section adapted for lifting a vehicle to be transported;
   a single power-actuated means for rotating said boom about first and second axes of rotation with respect to said supporting member;
   said first boom section being rotatably mounted at said first axis of rotation and said second boom section being rotatably mounted at said second axis of rotation, said boom being capable of movement by said single power-actuated means to:
   (i) a lowered load-lifting position by rotating said boom about said first axis of rotation; and
   (ii) a generally upright stored position by rotating said boom about said second axis of rotation; and
   cooperating first and second abutment means, said single power-actuated means operatively associated with said first boom section to:
   (i) rotate said first boom section about said first axis when said first and second abutment means are disengaged; and
   (ii) rotate said first and second boom sections about said second axis when said abutment means are engaged.

2. The vehicle—transporting apparatus of claim 1, further comprising:
   a flange means connected to said single power-actuated means and to said first boom section for operatively associating said single power-actuated means to said first boom section.

3. The vehicle-transporting apparatus of claim 2, wherein said first abutment means is disposed on said flange means and communicates with said second abutment means when said single power-actuated means is extended to a first predetermined length.

4. The vehicle-transporting apparatus of claim 3, wherein said first boom means is substantially perpendicular with respect to ground when said single power-actuated means is extended to a second predetermined length.

5. A vehicle-transporting apparatus, comprising:
   a supporting member having a lower end, said supporting member being mountable onto a transporting vehicle;
   a boom having first and second boom sections, said boom extending from the lower end of said supporting member and having a distal end on said second boom section adapted for engaging a vehicle to be transported;

a single power actuator operatively associated with said boom to rotate said boom about first and second axes of rotation with respect to said supporting member;

said first boom section being rotatably mounted at said first axis of rotation and said second boom section being rotatably mounted at said second axis of rotation, said boom being capable of movement by said single power actuator to:
  (i) a lowered load-lifting position by rotating said boom about only said first axis of rotation; and
  (ii) a generally upright stored position by rotating said boom about said second axis of rotation; and cooperating first and second abutments, said single power-actuator being operatively associated with said first boom section to:
  (i) rotate said first boom section about said first axis when said first and second abutments are disengaged; and
  (ii) rotate said first and second boom sections about said second axis when said abutments are engaged.

6. The vehicle-transporting apparatus of claim 5, further comprising:
  a flange connected to said single power-actuator and to said first boom section for operatively associating said single power-actuated means to said first boom section.

7. The vehicle-transporting apparatus of claim 6, wherein said first abutment is disponsed on said flange and communicates with said second abutment when said single power-actuator is extended to a first predetermined length.

8. The vehicle-transporting apparatus of claim 7, wherein said first boom section is substantially perpendicular with respect to ground when said single power-actuator is extended to a second predetermined length.

* * * * *